United States Patent
Wokaty, Jr.

(10) Patent No.: US 7,556,192 B2
(45) Date of Patent: Jul. 7, 2009

(54) SYSTEMS AND METHODS FOR DECISIONING OR APPROVING A FINANCIAL CREDIT ACCOUNT BASED ON A CUSTOMER'S CHECK-WRITING BEHAVIOR

(75) Inventor: Robert Dwane Wokaty, Jr., Richmond, VA (US)

(73) Assignee: Capital One Financial Corp., McLean, VA (US)

( * ) Notice: Subject to any disclaimer, the term of this patent is extended or adjusted under 35 U.S.C. 154(b) by 186 days.

(21) Appl. No.: 11/196,416

(22) Filed: Aug. 4, 2005

(65) Prior Publication Data

US 2007/0033135 A1 Feb. 8, 2007

(51) Int. Cl.
  *G07D 11/00* (2006.01)
  *G06K 5/00* (2006.01)
(52) U.S. Cl. ............................ 235/379; 235/380
(58) Field of Classification Search ............... 235/379, 235/375, 380, 382, 385.5; 705/35, 38
  See application file for complete search history.

(56) References Cited

U.S. PATENT DOCUMENTS

| | | | |
|---|---|---|---|
| 4,346,442 A | 8/1982 | Musmanno | |
| 6,088,686 A * | 7/2000 | Walker et al. | 705/38 |
| 6,119,103 A | 9/2000 | Basch et al. | |
| 6,658,393 B1 * | 12/2003 | Basch et al. | 705/38 |
| 6,783,065 B2 * | 8/2004 | Spitz et al. | 235/380 |
| 6,948,656 B2 * | 9/2005 | Williams | 235/380 |
| 7,131,571 B2 * | 11/2006 | Swift et al. | 235/375 |
| 2002/0139837 A1 * | 10/2002 | Spitz et al. | 235/375 |
| 2003/0101131 A1 | 5/2003 | Warren et al. | |
| 2003/0130919 A1 * | 7/2003 | Templeton et al. | 705/35 |
| 2003/0208439 A1 | 11/2003 | Rast | |
| 2005/0080717 A1 * | 4/2005 | Belyi et al. | 705/38 |
| 2005/0125360 A1 * | 6/2005 | Tidwell et al. | 705/65 |
| 2006/0031158 A1 * | 2/2006 | Orman | 705/38 |

* cited by examiner

*Primary Examiner*—Thien M Le
(74) *Attorney, Agent, or Firm*—Finnegan, Henderson, Farabow, Garrett & Dunner, LLP

(57) ABSTRACT

Embodiments consistent with the invention provide a computer-implemented method for determining a credit risk associated with a customer. The method comprises receiving a credit request from the customer, electronically requesting check-writing behavior information associated with the customer, electronically determining the credit risk of the customer based at least in part on the check-writing behavior information associated with the customer, and presenting a determination of credit eligibility based on the credit risk to the customer.

19 Claims, 2 Drawing Sheets

SYSTEMS AND METHODS FOR DECISIONING OR APPROVING A FINANCIAL CREDIT ACCOUNT BASED ON A CUSTOMER'S CHECK-WRITING BEHAVIOR

TECHNICAL FIELD

The present invention relates generally to computer-implemented systems and methods for determining the credit worthiness of customers. More particularly, the invention relates to systems and methods for determining the credit worthiness of customers based at least in part on their check-writing behavior.

BACKGROUND

Conventional systems assign credit limits to customers in a two-step process. First, credit issuers, such as a credit card issuer, identify potential customers based on information from credit bureaus. That information may include, for example, past credit history, prior declarations of bankruptcy, and the like. Once the issuer identifies potential customers, the credit issuer may offer credit or financial products to them. The offer typically includes a credit limit. The issuer usually selects the credit limit based on a tolerance level for the particular customer (i.e., an amount the issuer can afford to risk on a potential customer.) Once the customer responds to the offer, additional information is obtained and a final decision is made based on the customer's credit bureau information and specific behavioral and demographic data.

Second, after a period of time (e.g., six months, one year, two years, etc.), the issuer may consider whether to increase or otherwise adjust a customer's credit limit by studying the customer's past performance. For example, if the customer has demonstrated the ability to make timely payments, the issuer may increase the customer's credit limit. Otherwise, the issuer may decide to hold the credit limit at its current level or even decrease it, if needed.

Several problems exist with respect to such conventional systems. For example, a credit issuer typically grants a high initial credit limit based on credit bureau information. While the credit bureau information is generally accurate, it does not comprehensively reflect a customer's credit behavior. In other words, even customers with exemplary credit information may use all of their available credit without making any payments, resulting in possible loss to the credit issuer.

Another problem involves the long time period that may transpire before a credit limit increase is granted by the credit issuer. Because the initial credit limit is typically large, credit issuers usually wait a long period of time before even considering a credit limit increase. This can result in a loss of customers, if customers' requests for credit limit increases are denied or delayed.

Therefore, a need exists for assigning credit limits using an approach that more accurately determines and assigns credit limits reflective of the credit risk of a customer, and that can provide for rapid evaluations and credit limit increases.

SUMMARY

Accordingly, embodiments consistent with the present invention relate to systems and methods that may alleviate one or more of the limitations or disadvantages existing in the related art.

Embodiments consistent with the invention provide a computer-implemented method for determining a credit risk associated with a customer. The method comprises receiving a credit request from the customer, electronically requesting check-writing behavior information associated with the customer, electronically determining the credit risk of the customer based at least in part on the check-writing behavior information associated with the customer, and presenting a determination of credit eligibility based on the credit risk to the customer.

Embodiments consistent with the invention also provide a system for determining a credit risk associated with a customer. The system comprises a component for receiving a credit request from the customer, electronically requesting check-writing behavior information associated with the customer, a component for electronically determining the credit risk of the customer based at least in part on the check-writing behavior information associated with the customer, and a component for presenting a determination of credit eligibility based on the credit risk to the customer.

Embodiments consistent with another aspect of the invention provide a computer program product including instructions for execution by a processor to perform a method for determining a credit risk associated with a customer. The method comprises receiving a credit request from the customer, electronically requesting check-writing behavior information associated with the customer, electronically determining the credit risk of the customer based at least in part on the check-writing behavior information associated with the customer, and presenting a determination of credit eligibility based on the credit risk to the customer.

BRIEF DESCRIPTION OF THE DRAWINGS

The accompanying drawings, which are incorporated in and constitute a part of this specification, illustrate embodiments consistent with the invention and together with the description, serve to explain the principles of the invention. In the drawings.

DETAILED DESCRIPTION OF THE EMBODIMENTS

Figure 1:
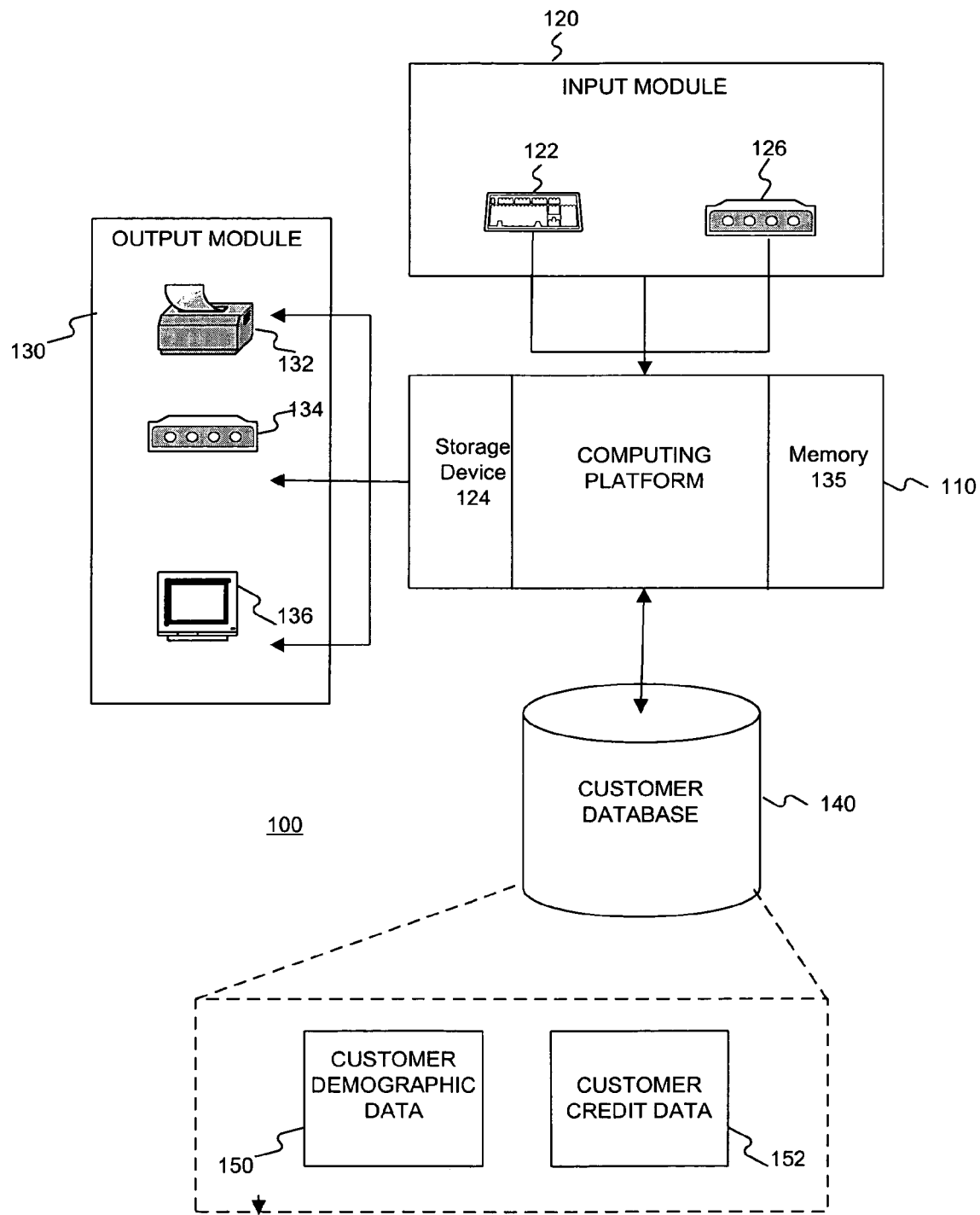
FIG. 1 illustrates an exemplary system environment for implementing embodiments of the present invention.

Reference will now be made in detail to exemplary embodiments consistent with the invention, examples of which are illustrated in the accompanying drawings. Wherever possible, the same reference numbers will be used throughout the drawings to refer to the same or like parts.

The following detailed description refers to the accompanying drawings. While several exemplary embodiments and features of the invention are described herein, modifications, adaptations, and other implementations are possible, without departing from the spirit and scope of the invention. For example, substitutions, additions, or modifications may be made to the components illustrated in the drawings, and the exemplary methods described herein may be modified by substituting, reordering or, adding steps to the disclosed methods. Accordingly, the following detailed description does not limit the invention.

Embodiments consistent with the present invention are directed to systems, methods, and computer-readable media for determining the credit risk of a customer based in part on their check-writing behavior. Embodiments consistent with the invention may be implemented in various environments, including computer-based environments, such as personal computers, workstations, servers, laptops, personal digital assistants (PDAs), mobile phones, handheld devices, and other computing devices, workstation, networked and other computing-based environments with one or more customers. The present invention, however, is not limited to such examples and embodiments consistent the invention may be implemented with other platforms and in other environments.

By way of example, embodiments consistent with the invention may be implemented using conventional personal computers (PCs), desktops, hand-held devices, multiprocessor computers, pen computers, microprocessor-based or programmable consumer electronics devices, minicomputers, mainframe computers, personal mobile computing devices, mobile phones, portable or stationary personal computers, palmtop computers or the like.

The storage media referred to herein symbolize elements that temporarily or permanently store data and instructions. Although storage functions may be provided as part of a computer, memory functions can also be implemented in a network, processors (e.g., cache, register), or elsewhere. Various types of storage mediums can be used to implement features of the invention, such as a read-only memory (ROM), a random access memory (RAM), or a memory with other access options. Further, memory functions may be physically implemented by computer-readable media, such as, for example: (a) magnetic media, like a hard disk, a floppy disk, a magnetic disk, a tape, or a cassette tape; (b) optical media, like an optical disk (e.g., a CD-ROM), or a digital versatile disk (DVD); (c) semiconductor media, like DRAM, SRAM, EPROM, EEPROM, memory stick, and/or by any other media, like paper.

Embodiments consistent with the invention may also include computer program products that are stored in a computer-readable medium or transmitted using a carrier, such as an electronic carrier signal communicated across a network between computers or other devices. In addition to transmitting carrier signals, network environments may be provided to link or connect components in the disclosed systems. Networking environments are commonplace in offices, enterprise-wide computer networks, intranets and the Internet (i.e., the World Wide Web). The network may be a wired or a wireless network. To name a few network implementations, the network may be, for example, a local area network (LAN), a wide area network (WAN), a public switched telephone network (PSTN), an Integrated Services Digital Network (ISDN), an infrared (IR) link, a radio link, such as a Universal Mobile Telecommunications System (UMTS), Global System for Mobile Communication (GSM), Code Division Multiple Access (CDMA), or a satellite link.

Systems, methods, and computer-readable media consistent with the present invention may more accurately predict the credit risk of a customer. Consequently, systems, methods, and computer readable media consistent with the present invention may consider criteria in addition to credit bureau information to determine the credit risk of a customer. More specifically, systems, methods, and computer readable media consistent with the present invention may obtain and analyze check-writing behavior information of a customer and determine the credit risk of the customer based in part on the check-writing behavior of the customer.

FIG. 1 illustrates an exemplary system environment 100, consistent with embodiments of the present invention. As illustrated in the example of FIG. 1, system 100 includes a computing platform 110, an input module 120, an output module 130, a memory 135, and a customer database 140. Computing platform 110 may be adapted to process input information received from input module 120. Computing platform 110 may further be adapted to provide output information to output module 130. Additionally, computing platform 110 may access information in customer database 140 for use in performing methods consistent with the present invention.

Computing platform 110 may comprise a general purpose computer (e.g., a personal computer, network computer, server, or mainframe computer) having a processor that may be selectively activated or reconfigured by a computer program to perform one or more methods consistent with the present invention. Computing platform 110 may also be implemented in a distributed network. Alternatively, computing platform 110 may be specially constructed for carrying-out methods consistent with the present invention.

Input module 120 may include an input device 122 and/or a network interface 126. Input device 122 may be implemented using a keyboard, mouse, speech recognition device, and/or data entering devices. Network interface 126 may receive information over any type of network (not shown), such as a telephony-based network (e.g., PBX or POTS), a local area network, a wide area network, a dedicated intranet, and/or the Internet. Computing platform 110 may also access data stored on storage device 124. Storage device 124 may include a memory, such as RAM or ROM memory, that contains instructions or data for performing one or more methods consistent with the present invention.

In determining the credit risk of a customer, input module 120 may be used to enter or obtain customer demographic information, customer requests for credit, traditional credit information associated from customers from a credit bureau, and/or check-writing behavior of customers. Such information and requests may be obtained, for example, from an employee, from storage device 124, and/or from another computing system via network interface 126. Computing platform 110 may store such information received from input module 120 in customer database 140.

As described below, computing platform 110 may use the stored customer information to determine the credit risk of a customer using methods consistent with the present invention. Computing platform 110 also provide notifications to output module 130. Output module 130 in turn outputs credit eligibility determinations to interested parties, such as the customer.

Output module 130 may include a printer 132, an output interface 134, and/or a display 136. Printer 132 may be used to provide a printout to interested parties of relevant information, such as credit eligibility determinations, the basis for such determinations, etc. Output interface 134 may be used to provide such relevant information and/or other information to the interested parties via the Internet, email, fax, page, etc. or save the information on a computer readable medium. Display 136 may be used to provide the credit eligibility determinations and/or other information to interested parties visually.

Customer database 140 may include customer demographic data 150 and customer credit data 152, as shown in FIG. 1. Customer demographic data 150 preferably includes a record of all personal data associated with customers, such as name, address, telephone number, driver's license number, social security number, credit card account number, checking account number, etc. Customer credit data 152 preferably includes a record of all credit eligibility factors associated with customers, such as credit history, check-writing behavior, number of credit inquiries made, debt-to-income ratios, credit rating scores, number of delinquent accounts over a certain period of time, payment histories, FICO scores, recovery scores, number of charged-off accounts with balances greater than zero, incomes, etc. The information to be stored in records 150 and 152 may be entered or obtained using input module 120.

Figure 2:
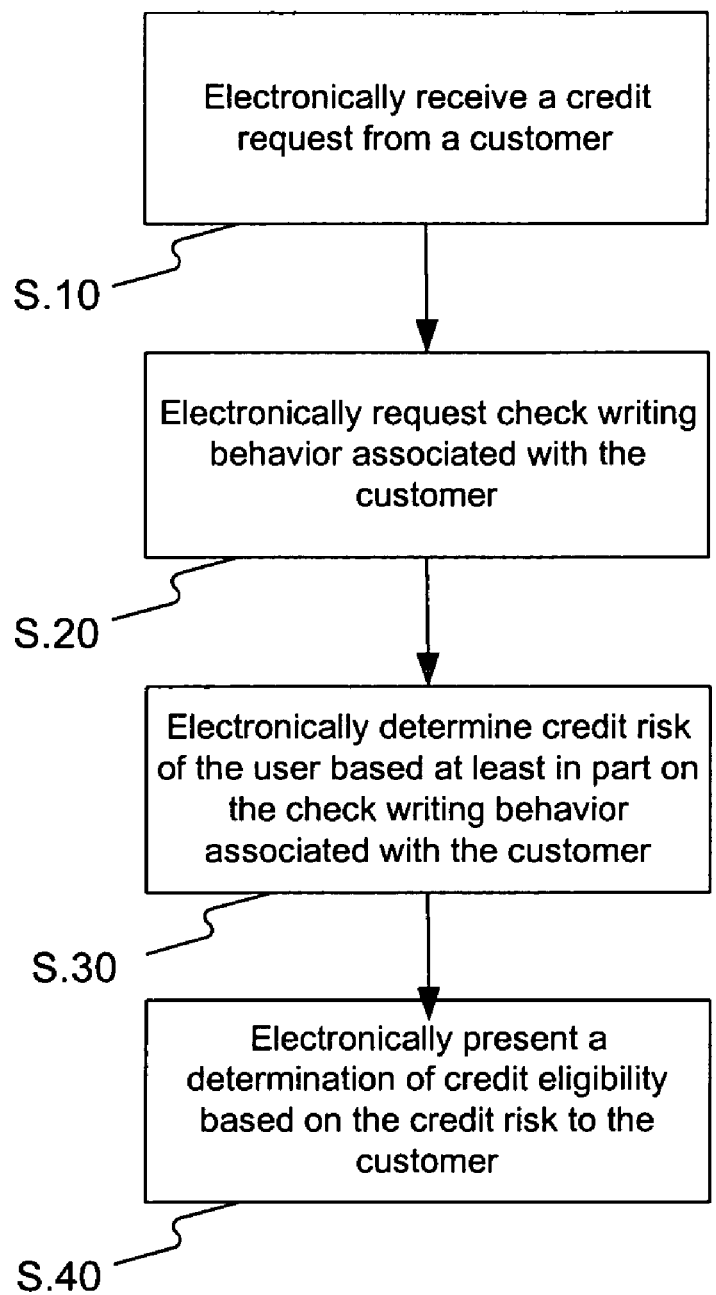
FIG. 2 is a flowchart of an exemplary process for determining a credit risk of a customer based on the check-writing behavior of the customer, consistent with an embodiment of the present invention.

FIG. 2 illustrates a flowchart of an exemplary process for determining the credit risk of a customer based on the check-writing behavior of the customer, consistent with an embodiment of the present invention. Although the steps of the credit determination process are described as being performed in a particular order, one skilled in the art will appreciate that these steps may be performed in a modified or different order. Further, one or more of the steps in FIG. 2 may be performed concurrently or in parallel.

First, computing platform 110 electronically receives a credit request from a customer (Step S.10). Customers can request credit to be given in connection with a variety of known forms, such as installment loans, credit card products, auto loans, mortgages, etc. In one embodiment, computing platform 110 can receive the credit request via network interface 126 from another computing system. In an alternative embodiment, computing platform 110 can receive the credit request from an employee at the organization who can enter the credit request via input device 122.

The request received from a customer (Step S.10) may include various information, such as demographic data. By way of example, Table 1 below lists exemplary demographic data that customers may provide along with the credit request. In one embodiment, the demographic data and/or other information regarding the credit request may be stored in customer database 140 for later usage or retrieval.

TABLE 1

| Demographic Information |
|---|
| Name, Address, Social Security Number, Driver's License Number |
| Balance Transfer Request |
| Balance Transfer Amount |
| Primary Income |
| Primary Other Income |
| Secondary Income |
| Secondary Other Income |
| Employment Indicator (H, Sal, Self, Retired) |
| Housing Indicator (O, R, other) |
| Accounts (check, sav, Money Market) |
| Customer indicates desire to take Cash Advance |
| School/College Year |
| School/College Name |
| Request Insurance |
| Time at Company |
| Email |
| Length of time at address |
| Monthly Mortgage/rent amount |
| Business Phone |
| Business Name |
| Length of time of employment at business |
| US Citizen |
| Permanent US Resident |

Next, computing platform 110 electronically requests check-writing behavior information associated with the customer (Step S.20). Computing platform 110 may request this information from any company or entity providing such information, such as Equifax®, Checkfree®, Telecheck®, etc., by providing identification information associated with the customer, such as the customer's social security number, checking account number, or driver's license number. By way of example, Table 2 below lists exemplary characteristics of check-writing behavior that may be obtained. For example, computing platform 110 can request data regarding the customer's history of bad checks that were passed by the customer over a certain period of time by providing the supplying company the customer's social security number.

TABLE 2

| Check-Writing Information |
|---|
| Unable to Locate |
| Closed for Cause |
| Closed for Cause and Purged |
| Stop Payment 4 field match |
| Stop Payment Serial # match |
| Post No Debits |
| Post No Checks |
| Closed |
| Closed and Purged |
| Divested |
| Divested and Purged |
| Pending Closed |
| Non Sufficient Funds/Overdraft |
| Enhanced Non Sufficient Funds |
| Sufficient Funds/Overdraft New Account |
| Uncollected Funds |
| Uncollected Funds/New Account |
| Dormant/Inactive |
| Deceased |
| Lost/Stolen Check(s) |
| Stop Payment & Amount Match |
| Attached |
| Return |
| New Account |
| Non-Direct Deposit Advices |
| Present |
| Aliases |
| Banking History |
| Alternate Address |
| Participant Credit Card Check |
| Participant Home Equity |
| Present |

Computing platform 110 may also obtain check-writing behavior information by analyzing payment activity stored in customer database 140. For instance, computing platform 110 can review payment activity of the customer to determine the number of payments made by the customer during a predetermined time period, such as a billing cycle, the time of payments made during a predetermined time, the monetary amount for the payments made during a predetermined time, etc. Traditional credit bureau information may also be obtained. Such information can be obtained through any commercially available source (such as the FICO model from Fair, Isaac and Company, Inc.) and/or through a financial clearing house, such as a major credit card bureau like TRW/Experian, Equifax, or TransUnion.

Computing platform 110 may then electronically determine the credit risk of the customer based at least in part on the check-writing behavior associated with the customer (Step S.30). For instance, if it is found that the customer has bounced several checks in the last six months, the credit risk of the customer may be found to be high and, accordingly, a lower credit limit may be given to the customer. In another example, if the customer does not have a sufficient credit history, a lower credit limit may also be given to the customer, such as $200. Therefore, even if the customer has a good check-writing history with a high likelihood of making payments on time, the customer may still be given a low credit limit as a customer with a bad check-writing history.

Alternatively, consistent with embodiments of the present invention, a customer's check-writing behavior may be given more weight in the determination of the customer's credit risk and, therefore, a customer without a sufficient credit history, but showing good check-writing behavior over a period of time, may be given a higher credit limit, such as $1,000 or $2,000. Further, if a customer has a good credit history, the presence of good or bad check-writing behavior can be used to raise or lower the credit limit, respectively. For example, if a customer was found to have a low credit score because of missed payments and a high number of credit inquiries made on the customer's account, the customer may nonetheless be given a higher credit limit than the customer would have historically received by exhibiting a good check-writing behavior.

These examples are only exemplary and any combination or permutation of the factors can be used to develop a credit model to determine the customer's credit risk and credit eligibility (credit limit). For instance, any combination of the factors listed in Table 1 and 2 along with traditional credit bureau information may be used to determine the customer's credit risk and eligibility. For example, if a customer has a good traditional credit score, but a return check code of "Uncollected Funds," computing platform 110 may determine by analyzing these factors along with the demographic information from Table 1 to decline any credit to the customer. As another example, if a customer has a good traditional credit score but a return check score of "Dormant/Inactive," computing platform 110 may determine that a lower credit limit should be offered. On the other had, if a customer has an average traditional credit score, but a "Present" return check code, computing platform 110 may find the customer to be a lower risk and a higher credit limit can be established.

In one embodiment, a credit model can be developed over time by analyzing and testing the results of various combinations and permutations involving the factors discussed above. For example, data regarding the above-mentioned factors stored in customer database 140 can be collected from customers that have been found to be good customers, and using multivariate regression analysis, predictive credit models can be developed to enable the prediction of the creditworthiness of future customers. For instance, after a multivariate regression model identifies the most predictive factors for determining credit risk of customers, it can create a credit risk model formula including only the identified factors. The formula can weigh each identified factor to minimize the error in generating a predictive risk score for customers. For example, the multivariate logistic regression model may, by using regression techniques well known in the art, weigh the most predictive of the identified factors more heavily than the least predictive of the identified factors.

Also, the weights may account for differences in the types of data analyzed. For example, the formula can allow percentages, probabilities, numbers, and/or dollar amounts to be entered simultaneously. A small number, such as a probability (ranging from 0-1) may be weighed more heavily than a large number, such as income, to account for the different data types. Although the multivariate logistic regression model described herein initially determines the weights, one skilled in the art can appreciate that the weights may be modified later to comply with experimental results or other personal experience, for example.

After generating the formula, computing platform 110 can create a credit risk grid using the historical customer data. To accomplish this, computing platform 110 can use the determined weighted combination of factors to determine the credit risk for each customer in the historical customer data. Computing platform 110 then can generate a credit risk grid by dividing these credit risk score determinations into a predetermined number of groups. For example, the determined credit risk scores may be divided into five groups, each group receiving a group score ranging from 1 (low) to 5 (high). In a preferred embodiment, computing platform 110 can determine the range of risks for each group according to the percentage of accounts that fall within that range. For example, the range of determined credit risks containing the highest 20% of the determined credit risks receives a group score of 5. The range containing the next highest 20% of the credit risk determinations receives a group score of 4, etc. One skilled in the art can recognize that other scoring methods are possible. The formula and credit risk grid may then be used to determine the credit eligibility of a particular customer. More particularly, computing platform 110 my enter the identified factors associated with the particular customer into the formula to determine the credit risk of the customer. Computing platform 110 then may use the credit risk grid to determine a group score (e.g., 1-5) for the customer based on the determined credit risk. The computing platform 110 then can make a determination about the credit eligibility and/or credit limit based on the score. For instance, if the customer is found to have a group score of 5 and considered a high risk customer, computing platform 110 may determine that the customer is not eligible for credit. On the other hand, if the customer has a lower group score, such as 4, then computing platform 110 may determine that the customer is eligible for credit, but with a low credit limit, such as $200. In another embodiment, a maximum credit line is determined based on the customer's score and then the maximum credit line is reduced based on one or more factors. For example, for a high credit score, a customer may be authorized to receive a credit card with a $2,500 credit line. However, applying one or more evaluation factors or areas, that credit line may be reduced if, for instance, the customer has a negative check writing history. In such a case, the credit line could be reduced by an amount, such as $500. Additional negative behavioral information, such as a choice for a lower minimum payment, could cause the credit line to be reduced further.

Check-writing behavior information can also be used in the determination of credit risk when a customer's credit account is re-evaluated. As mentioned previously, customers may have to wait six months to two years in order to have their credit accounts re-evaluated and possibly obtain a higher credit limit. However, by considering check-writing behavior information, more frequent re-evaluations can be made. For instance, computing platform 110 may request data every billing cycle regarding the number of payments made during selected billing cycles by the customer, the date that payments are made by the customer during selected billing cycles, the monetary amount for the payments made by the customer, etc. This data can be periodically analyzed in combination with credit bureau information and demographic information to re-evaluate the credit risk of the customer and make changes to the customer's credit limit, if warranted. For example, during an annual review, if the customer has routinely made multiple payments in a billing cycle or never bounced any checks, then the customer's credit limit can be increased accordingly.

In another example, some customers, like small business owners, may have a low credit limit, such as $500, but may need to routinely spend up to $1,000 a week. Typically, to keep the line of credit open, the customers send in multiple payment checks within one billing cycle. This kind of behavior may indicate a high likelihood of payments being received from the customer. Conventionally, such behavior would not be considered in the credit limit determinations for the customers. Additionally, these customers would typically have to wait six months to two years and have to build credit in order to obtain an increase in their credit limit. In contrast, in embodiments consistent with the principles of the present invention, a finding that a customer has made multiple payments within a billing cycle during a periodic review, can lead to the determination that the customer is a lower credit risk than would have historically been found and, therefore, a higher credit limit may be given at an earlier time. In order to prevent fraud, the monetary amounts for these payments may also be considered to verify, for example, that the payments are large enough to show a good-faith effort of paying the amount due in order to free up more credit.

Similarly, a customer who routinely makes payments early and in advance of assigned due dates, may suggest that the customer is a lower credit risk than would have historically been found and, accordingly, a higher credit limit may be given. Likewise, a customer who routinely makes payments greater than the amount that is actually due, may be found to be a lower credit risk than would have historically been found, and, accordingly, a higher credit limit may be given. For example, if a customer has an average balance due of $500, but routinely pays $1,500 in order to be able to spend more than the credit limit, this customer can be found to be a low credit risk and a higher credit limit may be given.

Additionally, during these re-evaluations, customers' accounts can be re-priced based on activity on other accounts. These re-pricings can be triggered by any predetermined event, such as late payments or periodic review. For instance, historically, if a customer is past due on one of several credit accounts with the credit issuer or other accounts in the credit community, the credit issuer may provide an incentive or re-price the customer's account to adverse terms (e.g., higher interest rate). This may be done to encourage the customer to pay the account down or to pay off the account and close it prior to the customer becoming financially insolvent. In embodiments consistent with the principles of the present invention, considering the customer's check-writing behavior may enhance such re-pricing determinations. For example, if a customer has bounced several checks recently, then the account, even if the customer is not past due on any other credit card accounts, may be re-priced in order to provide an incentive to the customer to pay the account down.

Returning to FIG. 2, computing platform 110 may present the determination of credit eligibility based on the credit risk to the customer. (Step S.40). For instance, computing platform 110 may send an email to the customer stating that the customer's credit request has been approved and provide an indication of the credit limit for the customer that was approved. Alternatively, computing platform 110 may display to the customer or mail to the customer a denial of the customer's credit risk and provide a basis for such a denial.

Other embodiments of the invention will be apparent to those skilled in the art from consideration of the specification and practice of the invention disclosed herein. It is intended, therefore, that the specification and examples be considered as exemplary only, with a true scope and spirit of the invention being indicated by the following claims.

What is claimed is:

1. A computer-implemented method for determining a credit risk associated with a customer, comprising:
    receiving a credit request from the customer,
    wherein the credit request includes demographic information related to the customer and includes a request for at least one of an installment loan, a credit card product, an auto loan, or a mortgage;
    electronically receiving check-writing behavior information associated with the customer, wherein the check-writing behavior information includes information regarding whether the customer is associated with one or more bad checks;
    electronically receiving credit bureau information reflecting a credit worthiness of the customer determined by a credit bureau;
    electronically determining the credit risk of the customer for the credit request based on a determined combination of factors related to the demographic information, the check-writing behavior information associated with the customer, and the credit bureau information;
    determining a credit eligibility for the customer based on the determined credit risk; and
    presenting the determination of credit eligibility to the customer.

2. The method of claim 1, wherein the steps of electronically receiving check-writing behavior information, electronically determining the credit risk of the customer, determining a credit eligibility for the customer, and presenting the determination of credit eligibility are repeated after a predetermined time to re-evaluate the credit risk associated with the customer.

3. The method of claim 2, wherein information regarding a number of payments made by the customer during a billing cycle is considered in re-evaluating the credit risk associated with the customer.

4. The method of claim 2, wherein re-evaluating the credit risk associated with the customer comprises analyzing the check-writing behavior information including information regarding at least one of a time when payments by the customer are made during a billing cycle or a monetary amount for the payments made by the customer.

5. The method of claim 2, wherein the method further comprises providing, after re-evaluating the credit risk associated with the customer, an incentive to the customer to pay down an account associated with the customer.

6. The method of claim 1, further comprising:
    determining a credit model based on an analysis of different combinations of the factors associated with the demographic information and check-writing behavior information associated with the customer; and
    identifying the determined combination of factors based on the credit model.

7. The method of claim 1, wherein determining the credit eligibility for the customer includes:
    determining the credit eligibility for the customer based on the determined credit risk and a group credit risk score for the customer, wherein the group credit risk score reflects a credit risk associated with a number of customers that have similar credit risks.

8. The system of claim 1, wherein the component that determines the credit eligibility for the customer includes:
    a component that determines the credit eligibility for the customer based on the determined credit risk and a group credit risk score for the customer, wherein the group credit risk score reflects a credit risk associated with a number of customers that have similar credit risks.

9. A system for determining a credit risk associated with a customer, comprising:
    a component that receives a credit request from the customer,
    wherein the credit request includes demographic information related to the customer and includes a request for at least one of an installment loan, a credit card product, an auto loan, or a mortgage;
    a component that electronically receives check-writing behavior information associated with the customer, wherein the check-writing behavior information includes information regarding whether the customer is associated with one or more bad checks;

a component that electronically receives credit bureau information reflecting a credit worthiness of the customer determined by a credit bureau;

a component electronically determines the credit risk of the customer for the credit request based on a determined combination of factors related to the demographic information, the check-writing behavior information associated with the customer, and the credit bureau information;

a component that determines a credit eligibility for the customer based on the determined credit risk; and a component for presenting the determination of credit eligibility to the customer.

10. The system of claim 9, further comprising:

a component that re-evaluates the credit risk associated with the customer after a predetermined time by implementing the components that electronically request check-writing behavior information, electronically determine the credit risk of the customer, determine a credit eligibility for the customer, and present the determination of credit eligibility to the customer.

11. The system of claim 10, wherein information regarding a number of payments made by the customer during a billing cycle is considered by the component that re-evaluates the credit risk associated with the customer.

12. The system of claim 10, wherein the component that re-evaluates the credit risk associated with the customer comprises a component that analyzes the check-writing behavior information including information regarding at least one of a time when payments by the customer are made during a billing cycle or a monetary amount for the payments made by the customer.

13. The system of claim 10, further comprising a component that provides, after re-evaluating the credit risk associated with the customer, an incentive to the customer to pay down an account associated with the customer.

14. The system of claim 9, further comprising:

a component for determining a credit model based on an analysis of different combinations of the factors associated with the demographic information and check-writing behavior information associated with the customer; and identifying the determined combination of factors based on the credit model.

15. A computer readable storage medium storing a program for that, when executed by a processor, performs a method for determining a credit risk associated with a customer, the method comprising:

receiving a credit request from the customer, wherein the credit request includes demographic information related to the customer and includes a request for at least one of an installment loan, a credit card product, an auto loan, or a mortgage;

receiving check-writing behavior information associated with the customer, wherein the check-writing behavior information includes information regarding whether the customer is associated with one or more bad checks;

receiving credit bureau information reflecting a credit worthiness of the customer determined by a credit bureau;

determining the credit risk of the customer for the credit request based on a determined combination of factors related to the demographic information, the check-writing behavior information associated with the customer, and the credit bureau information;

determining a credit eligibility for the customer based on the determined credit risk; and presenting the determination of credit eligibility to the customer.

16. The computer readable storage medium of claim 15, wherein the method steps of electronically receiving check-writing behavior information, electronically determining the credit risk of the customer, determining a credit eligibility for the customer, and presenting the determination of credit eligibility are repeated after a predetermined time to re-evaluate the credit risk associated with the customer.

17. The computer readable storage medium of claim 16, wherein information regarding a number of payments made by the customer during a billing cycle is considered in re-evaluating the credit risk associated with the customer.

18. The computer readable storage medium of claim 16, wherein re-evaluating the credit risk associated with the customer comprises analyzing the check-writing behavior information including information regarding at least one of a time when payments by the customer are made during a billing cycle or a monetary amount for the payments made by the customer.

19. The computer readable storage medium of claim 16, wherein the method further comprises providing, after re-evaluating the credit risk associated with the customer, an incentive to the customer to pay down an account associated with the customer.

* * * * *